US012625671B2

(12) United States Patent
Nash et al.

(10) Patent No.: US 12,625,671 B2
(45) Date of Patent: May 12, 2026

(54) AUDIO ARBITRATION FOR MULTIPLE MEDIA STREAMS

(71) Applicant: Ford Global Technologies, LLC, Dearborn, MI (US)

(72) Inventors: Brian Nash, Plymouth, MI (US); Kevin Lee Helpingstine, Ferndale, MI (US); Brendan Francis Diamond, Naples, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 18/673,464

(22) Filed: May 24, 2024

(65) Prior Publication Data

US 2025/0362865 A1 Nov. 27, 2025

(51) Int. Cl.
| | |
|---|---|
| *G06F 3/16* | (2006.01) |
| *B60K 35/21* | (2024.01) |
| *B60K 35/26* | (2024.01) |
| *B60K 35/29* | (2024.01) |
| *H04R 3/12* | (2006.01) |
| *G06F 3/01* | (2006.01) |

(52) U.S. Cl.
CPC .............. *G06F 3/165* (2013.01); *B60K 35/21* (2024.01); *B60K 35/26* (2024.01); *B60K 35/29* (2024.01); *H04R 3/12* (2013.01); *B60K 2360/182* (2024.01); *G06F 3/013* (2013.01); *H04R 2499/13* (2013.01)

(58) Field of Classification Search
CPC ........ H04R 3/12; H04R 2499/13; G06F 3/165
See application file for complete search history.

(56) References Cited

U.S. PATENT DOCUMENTS

| | | | |
|---|---|---|---|
| 9,219,967 B2 | 12/2015 | Nguyen et al. | |
| 9,544,682 B2 | 1/2017 | Nguyen et al. | |
| 9,731,602 B2 | 8/2017 | Kim et al. | |
| 9,740,452 B2 | 8/2017 | Vennstrom et al. | |
| 10,524,053 B1 * | 12/2019 | Moore ................... | H04R 1/403 |

(Continued)

FOREIGN PATENT DOCUMENTS

| | | |
|---|---|---|
| CN | 109542217 A | 5/2022 |
| JP | S63177604 A | 7/1988 |
| JP | 2000278626 A | 10/2000 |

OTHER PUBLICATIONS

"All-New Aehra SUV Redefines In-Car Experience With Unprecedented Cabin Space, Materials and Technology", Aehra—New Releases, https://www.aehra.com/news-release-detail?id=58348, published Nov. 21, 2022.

(Continued)

*Primary Examiner* — Disler Paul
(74) *Attorney, Agent, or Firm* — Frank Lollo; Brooks Kushman P.C.

(57) ABSTRACT

In a vehicle, a computer can receive a first content data including a first graphical component and a first audio stream and a second content data including a second graphical component and a second audio stream, and select a first audio output mode for the first audio stream and a second audio output mode for the second audio stream based on a priority determination that includes a priority of the first set of content data and/or a priority of the second set of content data, wherein the priority determination is based on a vehicle state.

20 Claims, 4 Drawing Sheets

(56) References Cited

U.S. PATENT DOCUMENTS

| | | | | |
|---|---|---|---|---|
| 10,891,921 | B2 | 1/2021 | Mittal et al. | |
| 11,052,761 | B2 | 7/2021 | Saito et al. | |
| 11,593,064 | B2 * | 2/2023 | Denis | G06F 3/165 |
| 12,079,538 | B2 * | 9/2024 | Le-Nindre | G06F 3/167 |
| 12,166,518 | B2 * | 12/2024 | Pandina | G06F 3/165 |
| 12,481,476 | B2 * | 11/2025 | Peard | H04R 3/12 |
| 2015/0110287 | A1 * | 4/2015 | Holdren | G10L 15/22 |
| | | | | 381/86 |
| 2022/0027120 | A1 * | 1/2022 | Kindig | H04L 67/306 |
| 2023/0376123 | A1 | 11/2023 | Yamamoto et al. | |
| 2024/0001763 | A1 | 1/2024 | Yokoyama et al. | |
| 2024/0420674 | A1 * | 12/2024 | Lam | G10K 15/04 |

OTHER PUBLICATIONS

"48-inch display debuts on the Lincoln Nautilus SUV", https://www.team-bhp.com/news/48-inch-display-debuts-lincoln-nautilus-suv, published Apr. 20, 2023.
"Samsung Pioneers 5G-Based Mobility with Launch of Digital Cockpit 2020", Samsung Pioneers 5G-Based Mobility With Launch of Digital Cockpit 2020—Samsung Global Newsroom, https://news.samsung.com/global/samsung-pioneers-5g-based-mobility-with-launch-of-digital-cockpit-2020, published Jan. 8, 2020.

* cited by examiner

AUDIO ARBITRATION FOR MULTIPLE MEDIA STREAMS

BACKGROUND

Computers included in a vehicle can output sets of content data to display devices and audio devices for vehicle occupants to view, listen to, and interact with. A content data can include a wide range of content such as vehicle data, vehicle service notices, navigation maps, entertainment data such as cable TV, movies, video games, and the internet via web browsers, and/or cellular telephone data such as text messages.

DETAILED DESCRIPTION

Figure 1:
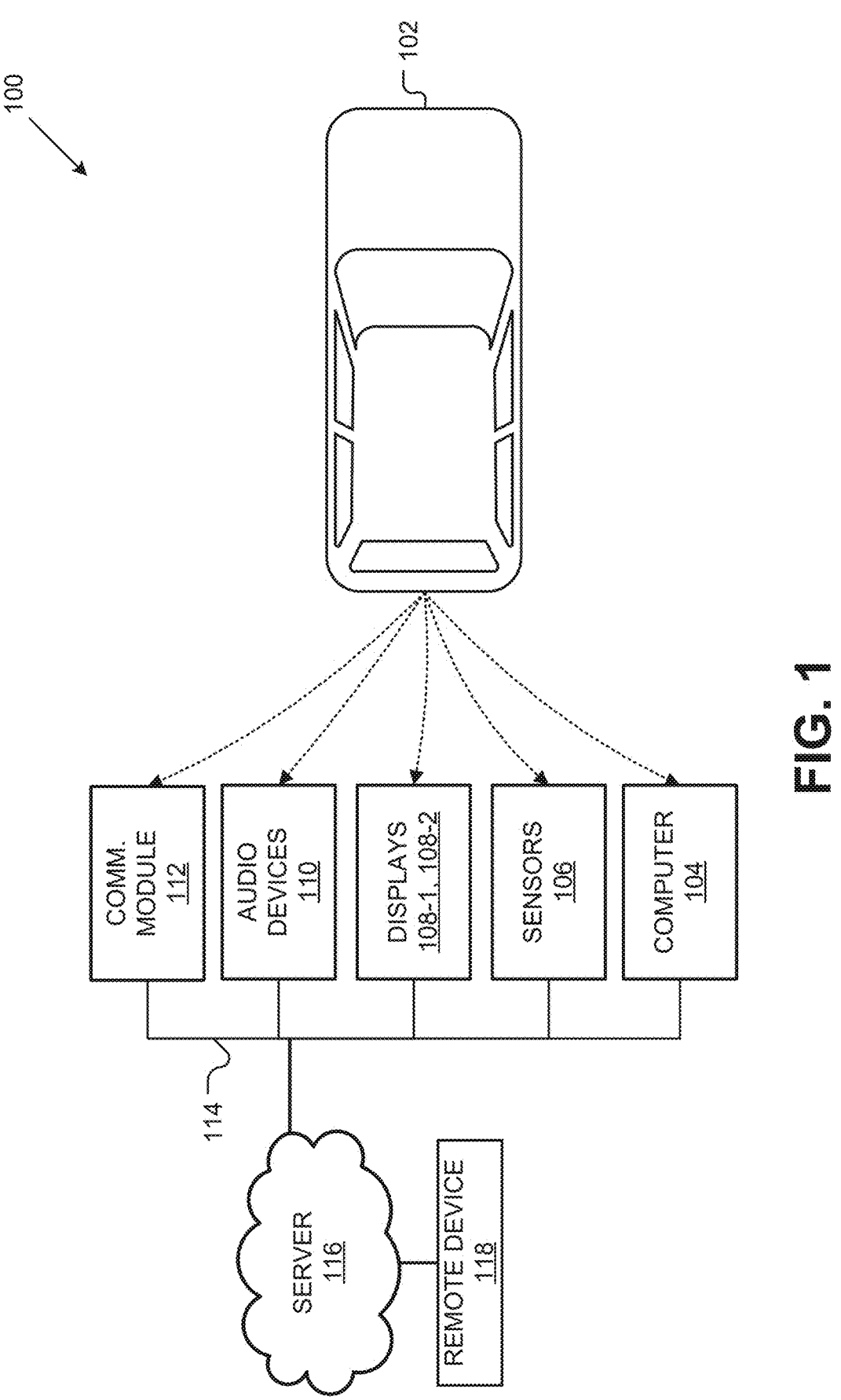
FIG. 1 is a block diagram of an example vehicle system.

The infotainment system described herein provides a way for multiple occupants of a vehicle to independently view, listen to, and interact with different sets of content data simultaneously. The infotainment system outputs the graphical components from two or more sets of content data to a display screen simultaneously. Each user may have an associated audio device, e.g., speakers directed at a user's position or location in the vehicle, i.e., a location in a vehicle cabin at which the user is sitting (hereinafter referred to as a user's "cabin position"), or wireless headphones associated with that user. A content data typically has an audio stream. For respective audio devices, the infotainment system determines a priority ranking for the associated user and selects an audio stream to output to the audio device according to that priority ranking. A priority ranking specifies, for an associated user, a relative priority of the content data 300, 302. The infotainment system selects the audio stream from the content data ranked highest in the priority ranking for that user. The infotainment system determines the priority ranking for a user based on the content types of the content data and on the gaze direction of the user. The content type is a categorization of the content data, e.g., navigation, podcast, streaming video, etc. The gaze direction may indicate which graphical component the user is viewing. Thus, the infotainment system enables the vehicle computer to output audio streams from sets of content data to specific audio devices such that only those users who desire to listen to the content data may listen to the content data.

Accordingly, included in the present disclosure is a system comprising a computer for a vehicle, the computer including a processor and a memory, the memory storing instructions executable by the processor, including instructions to: receive a first set of content data including a first graphical component and a first audio stream and a second set of content data including a second graphical component and a second audio stream, and select a first audio output mode for the first audio stream and a second audio output mode for the second audio stream based on a priority determination that includes a priority of the first set of content data and/or a priority of the second set of content data, wherein the priority determination is based on a vehicle state.

The first graphical component may be output by a first display and the second graphical component may be output by a second display.

The vehicle state may be a normal moving state, and the priority may be determined according to the normal moving state.

The vehicle state may be a parked state, and the priority may be determined according to the parked state.

The computer may receive a third content data including a third graphical component and a third audio stream and having a priority based on the vehicle state.

The first audio output mode and/or the second audio output mode may include muting or suppressing audio.

Selecting the audio output mode may include selecting an audio device to output the audio stream.

The computer may determine whether an audio device is configured for audio isolation, and to select the output mode based on whether the audio device is configured for audio isolation.

The priority of the first and second sets of content data may be based on an identity of a user associated with the first or second sets of content data.

The priority of the first and second sets of content data may be based on a content type of the first and second sets of content data.

The priority of the first and second sets of content data may be based on a gaze direction of a user.

A method comprises: receiving a first set of content data including a first graphical component and a first audio stream and a second set of content data including a second graphical component and a second audio stream, selecting a first audio output mode for the first audio stream and a second audio output mode for the second audio stream based on a priority determination that includes a priority of the first set of content data and/or a priority of the second set of content data, wherein the priority determination is based on a vehicle state.

The first graphical component may be output by a first display and the second graphical component may be output by a second display.

The vehicle state may be a normal moving state, and the priority may be determined according to the normal moving state.

The vehicle state may be a parked state, and the priority may be determined according to the parked state.

The computer may receive a third content data including a third graphical component and a third audio stream and having a priority based on the vehicle state.

The first audio output mode and/or the second audio output mode may include muting or suppressing audio.

Selecting the audio output mode may include selecting an audio device to output the audio stream.

The computer may determine whether an audio device is configured for audio isolation, and to select the output mode based on whether the audio device is configured for audio isolation.

The priority of the first and second sets of content data may be based on an identity of a user associated with the first or second sets of content data.

The priority of the first and second sets of content data may be based on a content type of the first and second sets of content data.

The priority of the first and second sets of content data may be based on an identity of a user associated with the first or second sets of content data.

With reference to the Figures, wherein like numerals indicate like parts throughout the several views, a vehicle system 100 includes a computer 104, including a processor and a memory, for a vehicle 102. The memory stores instructions executable by the processor, including instructions to, for a first content data 300 having a first graphical component and a first audio stream, output the first graphical component to a display screen 108, and, for a second content data 302 having a second graphical component and a second audio stream, output the second graphical component to the display screen 108 simultaneously with outputting the first graphical component to the display screen 108. Further, the computer 104 can, for a first user 200 associated with a first audio device 110, determine a first priority ranking of the first content data 300 and the second content data 302 based on content types of the first content data 300 and of the second content data 302. By detecting a first gaze direction of the first user 200, the computer 104 can select a first selection of one of the first audio stream or the second audio stream based on the first priority ranking and output the first selection to the first audio device 110. Further, for a second user 202 associated with a second audio device 110, the computer 104 can determine a second priority ranking of the first content data 300 and the second content data 302 based on the content types of the first content data 300 and of the second content data 302 and a second gaze direction of the second user 202. The computer 104 can then select a second selection of one of the first audio stream or the second audio stream based on the second priority ranking, and can output the second selection to the second audio device 110 simultaneously with outputting the first selection to the first audio device 110.

Exemplary System Elements

With reference to FIG. 1, a vehicle 102 includes a vehicle system 100. The vehicle system 100 includes a computer 104 having a memory that includes instructions executable by the computer 104 to carry out processes and operations including as described herein. The computer 104 may be communicatively coupled via a vehicle communication network 114 with sensors 106, displays 108, audio devices 110, and other components in the vehicle 102. The vehicle 102 may be any passenger or commercial automobile such as a car, a truck, a sport utility vehicle, a crossover, a van, a minivan, a taxi, a bus, ICE (Internal Combustion Engine), BEV (Battery Electric Vehicle), hybrid, a PHEV (Plug-in Hybrid Electric Vehicle), etc.

As mentioned above, the vehicle computer 104 (referred to below as "vehicle computer 104" or "computer 104") includes a processor and a memory. The memory includes one or more forms of computer readable media, and stores instructions executable by the computer 104 for performing various operations, including as disclosed herein. For example, the computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation (e.g., an ASIC for processing sensor data and/or communicating the sensor data). In another example, the computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in a computer 104. The computer 104 may be multiple computers coupled together.

The memory can be of any type (e.g., hard disk drives, solid state drives, servers, or any volatile or non-volatile media). The memory can store the collected data sent from the sensors 106. The memory can be a separate device from the computer 104, and the computer 104 can retrieve information stored by the memory via the network 114 in the vehicle 102 (e.g., over a CAN bus, a wireless network, etc.) Alternatively or additionally, the memory can be part of the computer 104 (e.g., as a memory of the computer 104).

The computer 104 may include programming to operate one or more of vehicle components such as propulsion (e.g., control of speed in the vehicle 102 by controlling one or more of an internal combustion engine, electric motor, hybrid engine, etc.), steering, interior and/or exterior lights, displays 108, audio devices 110, etc., as well as to determine whether and when the computer 104, as opposed to a human operator, is to control such operations.

The computer 104 is generally arranged for communications on the vehicle communication network 114 that can include a bus in the vehicle 102 such as a controller area network CAN or the like, and/or other wired and/or wireless mechanisms. Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

Via the vehicle network 114, the computer 104 may transmit messages to various devices and/or components in the vehicle 102 and/or receive messages (e.g., CAN messages) from the various devices and/or components (e.g., sensors 106, ECUs, etc.) Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

The sensors 106 may provide data about occupants of the vehicle 100. The sensors 106 can be cameras and can detect electromagnetic radiation in some range of wavelengths. For example, the sensors may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type.

The vehicle 102 may include a plurality of displays such as a first display 108-1 (referred to herein as a "panoramic display") and a second display 108-2 (referred to herein as a "console display") (displays 108-1, 108-2 are collectively referred to herein as "displays 108"). Displays 108-1, 108-2, display visual data, e.g., two-dimensional visual data, to occupants of a vehicle 102. The displays 108-1, 108-2 can be any suitable type for displaying content legible to the respective occupants, e.g., light-emitting diode (LED), organic light-emitting diode (OLED), liquid crystal display (LCD), plasma, digital light processing technology (DLPT), etc. Displays 108 can display visual data in monochrome or color via a screen and the visual data can be updated at a frame rate, which can be 60 frames per second, for example. Displayed visual data can be a static image, where the majority of the two-dimensional area does not change from frame to frame, or a dynamic image, where the majority of the two dimensional area changes from frame to frame. Visual data to be displayed on the displays 108 can be generated by a display controller. The display controller is a computing device such as an ECU or the like that can receive data to be displayed on the displays 108 in a visual format from computer 104, other vehicle ECUs, or from an external computing device 118 via server 116.

The displays 108 may be configured to output the sets of content data 300, 302. The displays 108 may be further configured to output the same set of content data 300, 302 or different sets of content data. Additionally, one or more displays 108-1 (e.g. the panoramic display) may be configured to output multiple sets of content data 300, 302 provided the specifications of the display 108-1 (e.g. size of the screen) are capable of supporting multiple programs (e.g. the screen is suitably large to allow multiple programs to be viewed).

Some displays 108-2 may allow for user interaction. For example, the display 108-2 may be a conventional touch-screen display, such that a user may provide input to the computer 104 via the display screen 108-2, e.g., a sets of content data 300, 302 to be outputted by the display 108-2 may be selected via the display screen 108-2. Additionally, data not included in sets of content data 300, 302 (e.g. vehicle maintenance data) may be interacted with via touch-screen technology. The touchscreen may be any suitable type for receiving an input from a user (e.g., resistive, capacitive, infrared, etc.).

The audio devices 110 can be any suitable device configured to output sound to occupants of the vehicle 102 (e.g., first user 200 and second user 202). For example, audio devices 110 may be speakers, personal devices (e.g., head-phones), etc. Speakers are electroacoustic transducers that convert an electrical signal into sound. The speakers can be any suitable type for producing sound audible to the respective user, e.g., dynamic. The portable device may be any suitable device for emitting sound to a single user, e.g., headphones such as in-ear or over-the-ear, a portable speaker, etc. The personal device may be connected to the vehicle network 114 via a wired connection such as an audio jack or a wireless connection such as Bluetooth™. Audio devices 110 can be part of the infotainment system, and thereby configure to output audio associated with sets of content data 300, 302.

The computer 104 may select audio output modes for audio streams. An audio output mode is a provision of content data 300, 302 that includes a volume (i.e., decibel level) of the audio stream and location(s) of output of the audio stream (i.e., a specification of one or more audio devices 110 from a plurality of available audio devices 110 for outputting the audio stream). The computer 104 may change all aspects of an audio mode or may change one aspect of the audio output mode while leaving another aspect or other aspects unchanged. For example, the computer 104 may adjust an audio output mode for a set of content data 300, 302 by decreasing the volume of the audio stream and/or changing which audio devices 110 are outputting the audio stream. The computer 104 may adjust an audio output mode based on priority ranking as described below.

Vehicle users 200, 202 may be associated with audio devices 110, i.e., a specific audio device 110 may be designated for a specific user 200, 202. The computer 104 may store user associations such that audio devices 110 are specified for respective users 200, 202. An audio device 110 may be associated with a user 200, 202 based on placement of the audio device 110 relative to the cabin position of the user 200, 202 (e.g. front area of a cabin versus rear area). The computer 104 may store associations between vehicle audio devices 110 and cabin positions. The stored associations may be specified during development of the computer 104 based on any desired criteria. Continuing the example, the stored associations may associate audio devices 110 to a closest occupant cabin position. For example, if the first user 200 is in an operator's cabin position 208 of the vehicle 102, then any audio devices 110 (e.g., speakers) supported by surfaces of the vehicle 102 which are closer to the operator's cabin position 208 than any other cabin position 208 or are oriented to emit sound toward the operator's cabin position 208 may be associated with the first user 200.

Audio device 110 association may also be based on the most recent user 200, 202 to select content data 300, 302 on the audio device 110, etc. The computer 104 may, after receiving a content data 300, 302 selection, using image data collected by the sensor 106, determine which user 200, 202 selected the content data 300, 302 and associate the user 200, 202 with the device 110 on which the user 200, 202 selected the content data 300, 302. As another example, if the second user 202 has access to a personal audio device 110 (e.g., headphones) which is in communication with the computer 104 (e.g., via wireless connection), then that audio device 110 may be associated with the second user 202. As a further example, the computer 104 may associate users 200, 202 with audio devices 110 based on user input. The user 200, 202 may specify to the computer 104 which audio devices 110 are to be associated with each user 200, 202 (e.g., via input to one of the displays 108).

Figure 2:
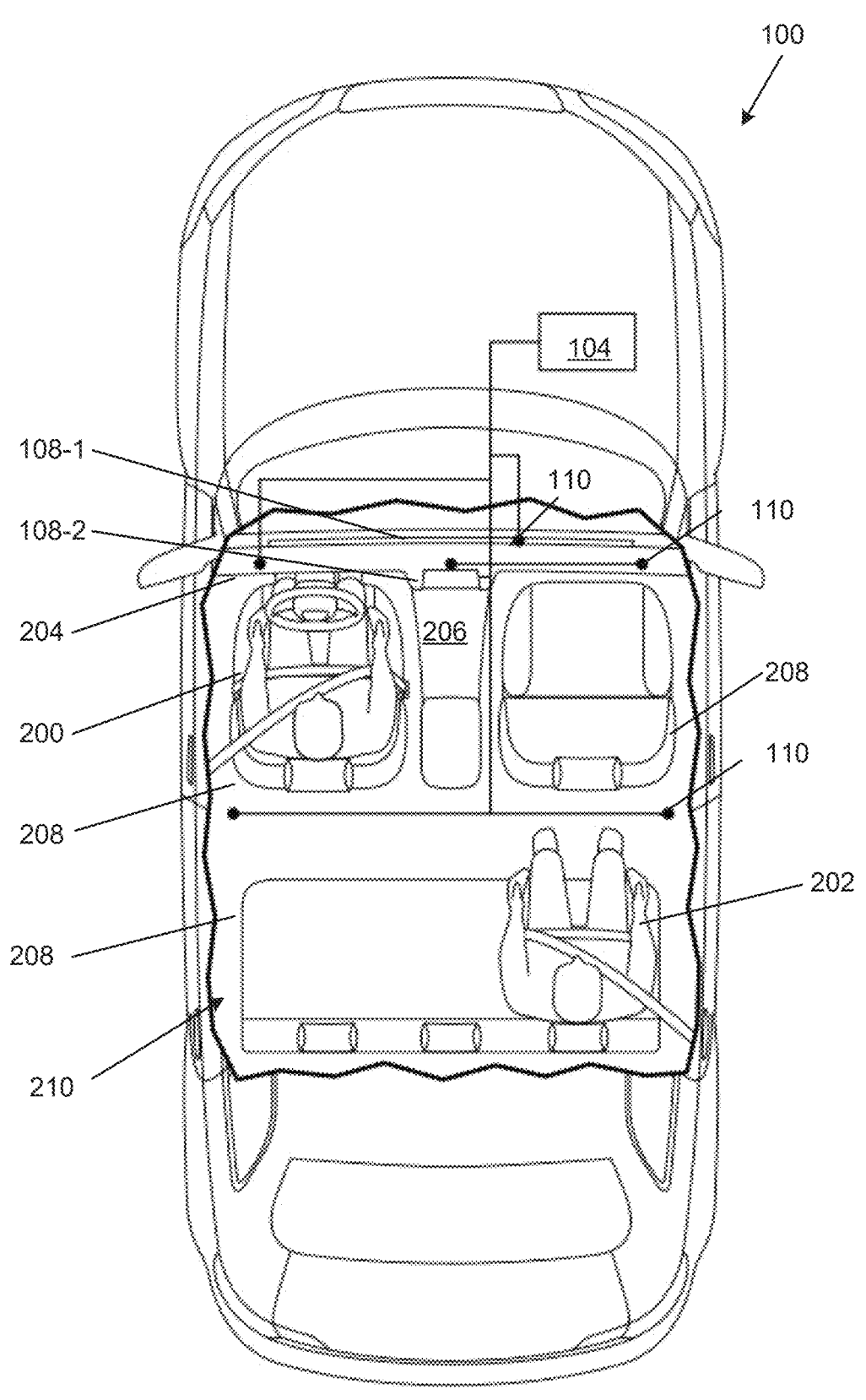
FIG. 2 is a top diagrammatic view of the vehicle with the passenger cabin exposed for illustration.

With reference to FIG. 2, a passenger cabin 210 of the vehicle 102 is shown. The passenger cabin 210 can house users 200, 202 of the vehicle 102. In this example, user 200 is located in an operator's cabin position 208 and user 202 is located in a rear right cabin position 208. The passenger cabin 210 includes one or more cabin positions 208, e.g., one or more of the cabin positions 208 disposed in a front row of the passenger cabin 210 and one or more of the cabin positions 208 disposed in a second row behind the front row. The passenger cabin 210 may also include cabin positions 208 in a third row (not shown) at a rear of the passenger cabin 210. The position and orientation of the cabin positions 208 and components thereof may be selected by the user 200, 202.

Figure 3:
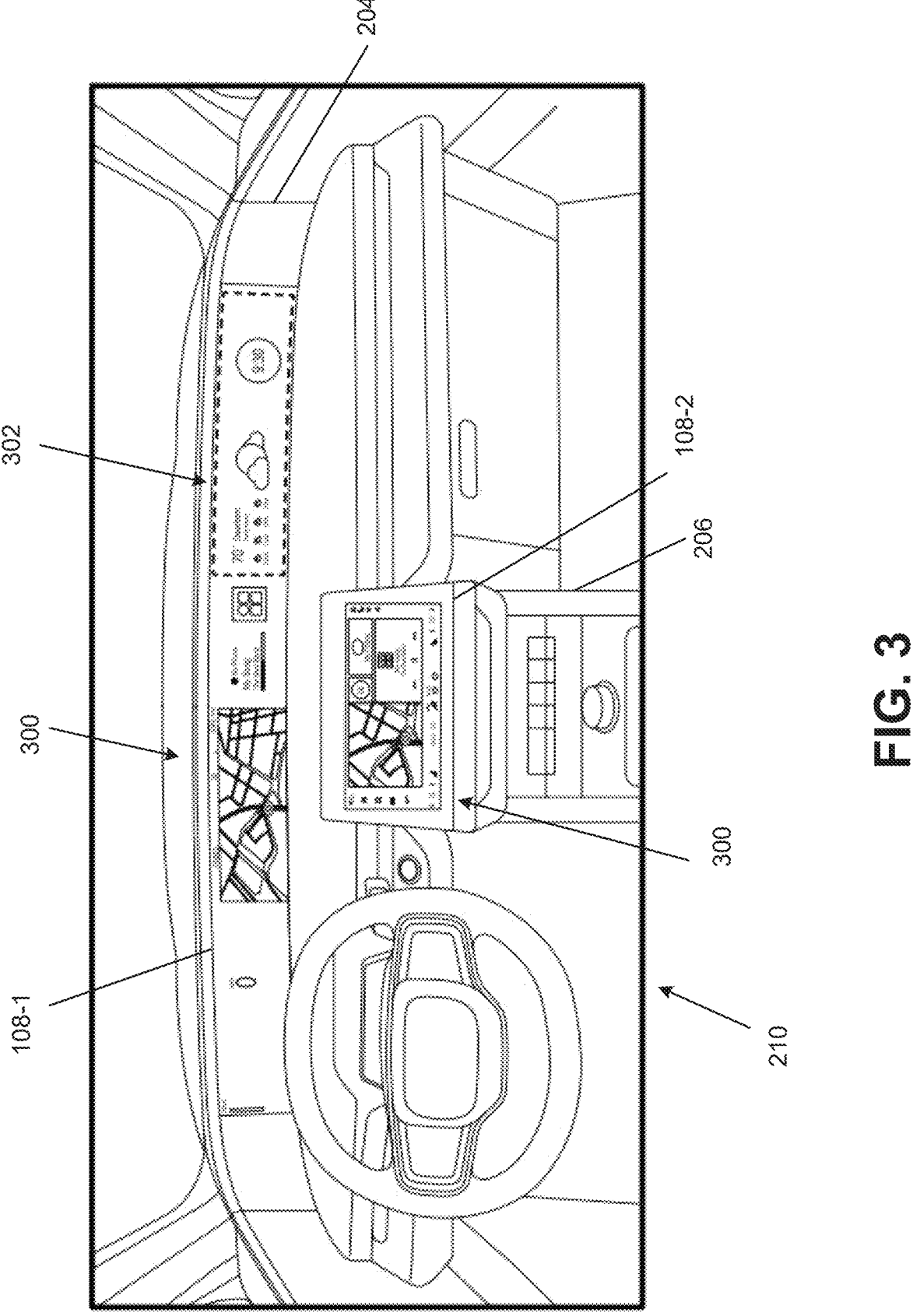
FIG. 3 is a diagram of an example dual view display.

Now referring also to FIG. 3, which illustrates a front-facing view of the vehicle cabin 210, the vehicle 102 may support a plurality of displays such as the displays 108-1, 108-2. The displays 108 may be supported by various surfaces of the vehicle such as a dashboard 204, a console 206, etc. in the present example, the display 108-1 is a panoramic display that includes a display screen that may be supported by the dashboard 204. The panoramic display 108-1 may be located on a top surface, e.g., an uppermost surface, of the dashboard 204. The panoramic display 108-1 may be located above a steering wheel and/or above an instrument cluster, and/or may display graphical data constituting an instrument cluster. The panoramic display 108-1, therefore, may be viewable by the users 200, 202 mitigating a need for the users 200, 202 to avert their gaze from the direction of travel of the vehicle 102.

The first display 108-1 may be a panoramic display (e.g., may have an aspect ratio greater than a typical widescreen aspect ratio, i.e., greater than 16:9). As illustrated, the panoramic display 108-1 extends from a first end of the dashboard 204 to a second end of the dashboard. For example, the panoramic display 108-1 may start at a first side of the vehicle 102 supporting the windshield and end at a second side of the vehicle 102 supporting the windshield. As another example, the panoramic display 108-1 may begin and end at points on the dashboard 204 that are generally between the two sides of the vehicle 102. For example, the panoramic display 108-1 may extend at least half of a length from one side to the other side.

The second display 108-2 (console display) may be supported by the center console 206. The console display 108-2 may be a part of the infotainment system such that sets of content data 300, 302 playable by the panoramic display 108-1 may be playable by the console display 108-2. The console display 108-2 may be visible from a range of angles that includes occupants in multiple locations in the vehicle 102, namely, a passenger and an operator. For example, the console display 108-2 may be located below the panoramic display 108-1, and the console display 108-2 may be laterally centered with respect to the vehicle 102. The aspect ratio of the console display 108-2 may be less wide than the panoramic display 108-1. For example, the aspect ratio may be standard (i.e., 4:3) or widescreen (i.e., 16:9).

The audio devices 110 may be mounted inside the vehicle 102 (e.g., in a passenger cabin 210). For example, audio devices 110 may be mounted to the dashboard 204, console 206, etc. Audio devices 110 may be mounted in the interior of the vehicle 102 as shown in FIG. 2. The audio devices 110 may be personal audio devices (e.g., wireless headphones) or may be dedicated internal audio devices (e.g. speakers) as shown. The audio devices 110 may be supported by the vehicle 102 in locations about the vehicle interior such that audio streams may be generally heard at a similar volume by users 200, 202 at different positions within the passenger cabin 210. For example, audio devices 110 (e.g., those audio devices mounted in the vehicle 102) may be positioned on the dashboard 204, console 206, sides of the vehicle 102, etc.

As illustrated in FIG. 3, displays 108-1, 108-2 can show respective sets of content data 300, 302. For the purposes of this disclosure, a "set of content data" means a stream of data including a graphical component (i.e., an image or images that are visually detectable) and an associated audio stream. In various implementations, content data 300, 302 may be prerecorded and streamed from memory, and/or may be generated or streamed from a remote source in real time. The vehicle system 100 may output multiple sets of content data 300, 302 simultaneously, e.g., a first content data 300 and a second content data 302 as shown in FIG. 3. The first content data 300 may include a first graphical component and a first audio stream, and the second content data 302 may include a second graphical component and a second audio stream. Graphical components and audio streams are described in further detail below. The panoramic display 108-1 in the illustrated example is outputting graphical components from a first content data 300 and a second content data 302. The console display 108-2 is outputting graphical components of the first content data 300. In the present non-limiting example, the first content data 300 is a navigation program including a map. The second content data 302 is a weather forecast.

Sets of content data 300, 302 may be selectable by the users 200, 202. That is, the users 200, 202 may interact with the vehicle computer 104 (e.g. via a touchscreen interface of the displays 108-1, 108-2 or another input device) to request that one or more sets of content data 300, 302 be output by one or both of the displays 108-1, 108-2. Alternatively, or additionally, sets of content data 300, 302 may be output based on instructions stored by the vehicle computer 104. For example, the computer 104 may cause output of a navigation content data when no sets of content data 300, 302 has been requested by the users 200, 202. As a further example, the computer 104 may cause output of notification content data 300, 302 based on a vehicle being in a state that warrants giving priority to the notification content, as described in further detail below.

Sets of content data 300, 302 include respective graphical components. For example, the first content data 300 may include a first graphical component, and the second content data 302 may include a second graphical component, respectively. For the purposes of this disclosure, a graphical component is defined as the visual data included in content data 300, 302 (e.g., according to a video or image display format whereby an image and/or a frame or frames in a stream of images is provided as an array of pixels). The graphical component might be a static or dynamic display of information, a video stream, etc. For example, the graphical component of a first content data 300 that is a navigation program, as shown in FIG. 3, would be a map that may include a node indicating a relative position of the vehicle 102. For another example, the graphical component of the second content data 302 that is a weather program, as shown in FIG. 3, would be display of various weather information such as temperature, cloud cover, etc. As another example, if the first content data 300 is a movie or the like, and the second content data 302 is a video call, then the first graphical component would be the video stream of the movie and the second graphical component would be the video stream of the video call.

Sets of content data 300, 302 further include respective audio streams. The first content data 300 may include a first audio stream and the second content data 302 may include a second audio stream. For the purposes of this disclosure, an audio stream is defined as audio data included in the set of content data 300, 302. Audio streams of content data 300, 302 may be output from audio devices 110 in conjunction with the graphical components being output from displays 108-1, 108-2 for the respective sets of content data 300, 302. The audio stream of a content data may be synchronized to the graphical component of that content data 300, 302 (e.g., the audio accompanying a streaming video, audio navigation instructions triggered as the present location reaches predefined points along a route displayed in the graphical component, etc.). For example, conventional formats for providing streaming video with associated audio typically include mechanisms for synchronizing audio and video. Continuing with the previous example, if the first content data 300 is a movie and the second content data 302 is a video call, then the first audio stream would be the audio associated with the movie, and the second audio stream would be the audio of the video call.

The displays 108-1, 108-2 may display visual information that is not part of a content data 300, 302. For example, the display screen 108-1 may display vehicle information as part of an instrument cluster (e.g., vehicle speed, engine speed, engine temperature, etc.) without accompanying audio data.

The audio devices 110 may be supported or installed about the vehicle 102 in locations in the cabin 210. Further, the computer 104 may select to output an audio stream to some but not all audio devices 110 while a graphical component included in the content data 300, 302 that also includes the audio stream is output to one or more displays 108. That is, the computer 104 may output different audio streams simultaneously to different audio devices 110. Thus, where a first audio stream and a second audio stream are being played simultaneously, a user 300, 302 may hear the first audio stream without hearing or being occupied by the second audio stream. To output multiple audio streams from different audio devices 110 in a manner to minimize or reduce interference of the audio streams with users 200, 202 to whom the audio streams are not directed is referred to herein as "audio isolation."

Devices 110 may be configured for audio isolation. Audio isolation may be achieved, for example, where an audio stream is output to a personal audio device 110 such as headphones, wherein a user 200, 202 receives sound from the audio stream and other sounds are prevented or reduced in reaching the user's ears. In some examples, audio isolation may be achieved by changing the audio output mode of audio streams to output the audio streams via specified audio devices 110 (e.g. vehicle speakers) that are arranged to cancel or interfere with sound from one another. For example, if the audio device 110 is a speaker, the computer 104 may output the audio stream at a volume that is typically intelligible to the respective user and inaudible or at least unintelligible to other users 200, 202, which may be facilitated by the speaker being directed to the cabin position 208 in which that user 200, 202 is sitting. Additionally, the computer 104 may execute a suitable active-noise-cancellation algorithm to produce cancellation audio data that cancels (i.e., reduces) the audio data stream from another user 200, 202. An active-noise-cancellation algorithm may either invert or phase shift the sound wave contained in the audio stream, resulting in the cancellation audio data. Outputting the cancellation audio data can cause destructive interference with the sound that produced the input audio data. For example, cancellation audio data for cancelling the first audio stream may be added to the second audio stream in order to isolate (i.e., minimize or reduce interference for) the second user 202. Such techniques can be useful where users 200, 202 do not have access to personal audio devices 110 (e.g. Bluetooth headphones) which would generally perform the function of audio isolation by blocking out those audio streams that the user 300, 302 does not wish to listen to. In examples where the user 202 does have access to personal audio devices 110, the computer 104 may associate those personal audio devices 110 with specific users 202 (e.g. where the user connects headphones to the computer 104 via Bluetooth and specifies that the headphones belong to the user 202).

An audio device 110 may be positioned such that audio isolation cannot be performed effectively. Such audio devices 110 are herein referred to as "nonisolated." The computer 104 may determine whether audio isolation is possible based on the positioning of the audio devices 110. For example, the computer 104 may store in memory an identification of the audio devices 110 that are mounted in the passenger cabin 210 as isolated or nonisolated. Upon determining that a first audio device 110 and a second audio device 110 are nonisolated audio devices 110 (e.g., where the audio devices 110 are vehicle speakers positioned to output sound in the cabin 210), the computer may output the same audio stream to the first audio device and the second audio device, rather than attempting to output different audio streams (e.g. the first audio stream and second audio stream) to different nonisolated audio devices 110.

The computer 104 may cause output of more than one content data 300, 302 simultaneously. That is, the computer 104 may cause output of the first graphical component and the first audio stream of the first content data 300 via displays 108-1, 108-2 and audio devices 110 while also outputting the second graphical component and the second audio stream via displays 108-1, 108-2 and audio devices 110. Typically, the first audio stream and the second audio stream of respective sets of content data 300, 302 are played via different audio devices 110, or one of the audio streams is cut off (e.g., muted) from being played on audio devices 110 such that another audio stream may be played on the audio devices 110.

Alternatively, graphical components of sets of content data 300, 302 may be played simultaneously on different displays 108-1, 108-2 or simultaneously on the same display 108 (e.g., the panoramic display 108-1). For example, the panoramic display 108-1 may cause output of a graphical component of a navigation program on a left side of the display screen while simultaneously outputting a graphical component of a weather forecast program on the right side of the display screen. Further, where the display 108-1, 108-2 is outputting graphical components from a plurality of sets of content data 300, 302, the display 108-1, 108-2 may rearrange, cease outputting, or cause output of (for reasons described below) additional graphical components while also outputting other graphical components.

The computer 104 may cause output of graphical components and audio streams of sets of content data 300, 302 based on priority rankings of the sets of content data 300, 302. As used herein, "priority ranking" is a listing of content data 300, 302 by a numeric value (i.e., a "priority score") that indicates to a relative weight or importance of a content data 300, 302. Sets of content data 300, 302 may be assigned or associated with baseline (i.e., default) priority scores. The baseline priority scores may be stored in a lookup table or the like that is stored in a memory of the computer 104 and that is specified by an equipment manufacture such as a vehicle manufacturer. When content data 300, 302 is to be output, the computer 104 may retrieve the baseline priority lookup table and find the baseline priority for respective sets of content data 300, 302. The computer 104 may then assign the respective baseline priorities to the sets of content data 300, 302 and can then adjust the respective priorities based on dynamic, (i.e., changing over time and possible real-time) factors such as vehicle state (e.g., moving or parked), content type, and content sub-type, as described further below.

The computer 104 may cause the output of the set of content data 300, 302 with the highest priority and pause the content data 300, 302 with lower priority. Additionally, or alternatively, the computer 104 may adjust the audio output mode of a lower priority set (or sets) of content data 300, 302 by decreasing (or "suppressing") the volume of the associated audio streams rather than ceasing output. Adjustment of the audio output mode of lower priority content data 300, 302 may be based on vehicle state (described below).

The priority ranking of the sets of content data 300, 302 may be dynamically determined by the computer 104 (e.g. based on a stored algorithm). For example, the priority ranking may be a set of scores each ranging from 1-100, where a lower score would indicate lesser importance and a higher score would indicate higher importance. Each content data 300, 302 may have a corresponding score, and the priority ranking is an ordering of the sets of content data 300, 302 according to the scores (e.g., in descending order from greatest score to lowest score). For another example, the priority ranking may be an ordering of the sets of content data 300, 302 without scores for the individual sets content data 300, 302 (e.g., based on a set of rules).

Where audio isolation is not available (e.g. where the only audio devices in communication with the computer 104 are vehicle speakers that cannot provide noise cancellation or interference), the computer 104 may determine a single priority ranking including all sets of content data 300, 302 which applies to all nonisolated audio devices 110. Alternatively, where audio isolation is available (e.g. where the first user 200 is listening to sets of content data 300, 302 via dedicated nonisolated vehicle speakers and a second user 202 is simultaneously listening to sets of content data 300, 302 via headphones), the computer 104 may allow the user 200, 202 associated with the isolated device 110 to override the priority ranking for the isolated device 110 such that the only content data 300, 302 being output by the isolated audio device 110 is that content data 300, 302 selected by the associated user 200, 202. In other words, the computer 104 may determine a priority ranking of the sets of content data 300, 302 to be used by all nonisolated audio devices 110, and may not take isolated devices 110 into consideration when determining the priority ranking and outputting audio streams. Additionally, or alternatively, the computer 104 may determine separate priority rankings for each of the isolated devices as well as the priority ranking for all non-isolated devices.

The computer 104 may adjust the audio output mode of the sets of content data 300, 302 based on the priority scores or ranking. For example, sets of content data 300, 302 which are lower in a priority ranking than other sets of content data 300, 302 may be muted or have their volume decreased. Where priority ranking is score-based, the computer 104 may decrease the volume of sets of content data 300, 302 by a percentage of the maximum possible volume for each priority score difference between it and the highest ranking data 300, 302 (e.g. The computer 104 may decrease the volume of a set of content data 300, 302 by 10% if it is 10 priority score points below the highest priority set of content data 300, 302). Alternatively, the computer 104 may mute all data 300, 302 that is not at the top of the priority ranking.

The computer 104 can determine the priority ranking (i.e. score) based on adding or subtracting from the baseline priority based on dynamic factors. The factors and the adjustments that the computer 104 makes may be included in a stored lookup table (the priority ranking lookup table). The priority ranking lookup table may specify factors that affect priority such as the content types of the sets of content data 300, 302, the presence of a conversation between the users 200, 202, the gaze direction of the user 200, 202, identities of the users 200, 202 that requested each content data (where audio isolation is not available), and/or preferences inputted by the users 200, 202, as will each be described in turn below. The computer 104 may calculate the scores for each content data 300, 302 based on the adjustments specified by the priority ranking lookup table corresponding to each factor. The priority ranking lookup table may be specified by an equipment manufacture such as a vehicle manufacture, and may specify adjustments to be made to the priority ranking in response to various dynamic factors (e.g., vehicle speed, whether a vehicle is moving or parked, etc.).

The computer 104 may assign respective numerical values to factors (e.g., a numerical value for each of different sets of content data 300, 302). The numerical values may include a numerical value for the presence of a conversation and a numerical value for the absence of a conversation, a numerical value for the user 200 looking toward the graphical component of the content data 300, 302 displayed on the screen 108-1 and for the user 200 looking away from the content data 300, 302 displayed on the screen 108-1, etc. The computer 104 may then combine the numerical values for each content data into a single score (e.g., a weighted sum of the numerical values). The computer 104 may then rank the content data 300, 302 in order of the scores. An example expression that the computer 104 may use to calculate priority score is represented by equation 1:

$$\text{Equation 1}$$

$$\text{Priority Score} = \text{Baseline Priority Score} + F_1 + F_2 + F_3 + \ldots F_N$$

where F refers to the adjustments to be made based on respective factors as specified by the priority ranking lookup table (e.g., plus 10 for gaze direction, minus 5 for advertising sub-type, etc.)

Table 1 represents an example priority ranking lookup table which the computer 104 may use (in addition to other lookup tables) to adjust priority ranking where priority ranking is score based. Table 1 is a table corresponding to content sub-type specifically (described in further detail below):

TABLE 1

| Data | Action |
|---|---|
| Content sub-type of content data is advertising | Decrease priority score of the content data by 10. |
| Content sub-type of content data is non advertising | Do not adjust the priority score of the content data. |

For another example of how the computer 104 may determine priority ranking, the computer 104 may execute a set of prestored rules for ranking the sets of content data 300, 302 (e.g., the content data 300, 302 at which the user 200 is looking is ranked higher than other sets of content data 300, 302 of the same content type, sets of content data 300, 302 of certain content types are ranked higher than other types regardless of the gaze direction of the user 200, etc.)

Table 2 represents an example priority ranking lookup table which the computer 104 may use (in addition to other lookup tables) to adjust priority ranking where priority ranking is rules based. Table 2 is a table corresponding to content sub-type specifically (described in further detail below):

TABLE 2

| Data | Action |
|---|---|
| Content sub-type of content data is advertising | Place the content data at the bottom of the priority ranking. |
| Content sub-type of content data is non advertising | Do not adjust the placement of the content data in the priority ranking. |

User selection may affect priority ranking of sets of content data 300, 302 where audio isolation is not available (e.g. where there is only one priority ranking for all audio devices 110). For example, the computer 104 may increase the priority score or placement of sets of content data 300, 302 that are requested by the user 200 positioned in a front left position 208 of the cabin 210. In an example where priority ranking is score based, if the first user 200 requests the first content data 300 and the second user 202 requests the second content data 302, the priority ranking lookup table (mentioned above) may specify that the priority score of the first content data 300 is increased by 10 and the priority score for the second content data 302 is unchanged in the priority ranking for all nonisolated audio devices 110. Alternatively, or additionally, in an example where priority ranking is rules based, the computer 104 may be programmed to specify that any content data 300, 302 selected by the user 200 is always assigned a higher priority ranking in the priority ranking for nonisolated audio devices 110 than sets of content data 300, 302 selected by any other user 202.

Priority ranking may be based in part on a content type of the content data 300, 302. As used herein, "content type" refers to a qualitative categorization according to the subject matter of the specific material presented by the content data 300, 302. For example, the content type may be one of a navigation program, a podcast, a streamed video, a vehicle notification etc. The priority ranking lookup table may specify that (regardless of priority score) some content types are always given the highest priority over other content types. For example, the priority ranking lookup table may specify that sets of content data 300, 302 which are notifications (e.g., traffic alerts) may always be given the highest priority in the priority ranking.

Content types of content data 300, 302 may have further content sub-types. Content sub-types are a further categorization of the subject matter presented by a type of content data 300, 302. Not all content types include content sub-types. As an example of content sub-type, if the content type of the content data 300, 302 is a podcast, a content sub-type may be "advertising" and another content sub-type may be "podcast content." The content sub-type of the same content data 300, 302 being played or streamed may change over time (e.g., an advertising section of a streamed video and a nonadvertising section of a streamed video may be respective sub-types of a podcast content type that are played at different times of the podcast). The computer 104 may determine the content sub-type of a content data 300, 302 according to a label or other metadata included and/or associated with the content data 300, 302 that indicates the content sub-type. Alternatively or additionally, the computer 104 may determine the content sub-type of the content data 300, 302 based on a trained neural network (described below).

The computer 104 determines the priority rankings based at least in part on the content sub-type of the content data 300, 302. The computer 104 may change the determination in real time based at least in part on the content sub-type (e.g., in response to the content sub-type of a content data 300, 302 changing). Where priority ranking is score based, the computer 104 may reference the priority ranking lookup table specifying how the score is adjusted based on the content sub-type (e.g., a content sub-type that is advertising warrants a priority score decrease of 10). For example, if the first content data 300 is a commercial, the computer 104 may determine the content sub-type of the first data 300 to be advertising and decrease the score accordingly. As another example, the computer 104 may give a higher priority score or placement in the priority ranking in response to the content sub-type of the content data 300, 302 being a phone call. For example, user 200 receives a phone call as the second content data 302. The computer 104 gives a higher priority score to the second content data 302 than to the first content data 300 such that the first content data 300 is muted or has its volume decreased. Where the priority ranking is rules based, the computer 104 may reference the priority ranking lookup table specifying the relative ranking of each content data 300, 302 based on the content sub-type of the data. For example, the table may specify that sets of content data 300, 302 of the advertising sub-type are always placed below sets of content data 300, 302 of a non-advertising content sub-type.

The neural network for determining content sub-type may be trained to identify content sub-types of sets of content data 300, 302 based on a training process. In training a deep neural network, a training dataset that includes example sets of content data 300, 302 of various content sub-types may be used. The training dataset can include thousands of examples sets of content data 300, 302, each of which is of a specific content sub-type. The deep neural network can be executed on the dataset of sets of content data 300, 302 multiple times, where each time the deep neural network is executed the output prediction is compared to a ground truth to determine a loss function. The loss function can be backpropagated through the deep neural network from output layers to input layers to adjust weights which govern processing for each layer to minimize the loss function. When the loss function reaches a user-determined minimum for the training dataset, the deep neural network training can be deemed complete, and the weights indicated by the minimum loss function may then be stored with the trained deep neural network.

The computer 104 may adjust content data 300, 302 score based on conversation between users 200, 202. Conversation, as used herein, refers to conversation between users 200, 202 and not between a user 200, 202 and a third party (e.g. via a phone call which could be considered as a content sub-type). The computer 104 may detect conversation based on known voice recognition systems. For example, the computer 104 may utilize a neural network trained (using a method similar to that described above) to recognize speech. When audio sensors 106 detect audio and the computer 104 determines the audio to be the speech of one or more users 200, 202 according to the neural network, the computer 104 may proceed accordingly. As conversation does not refer to any virtual data, it is not a "content data." Generally, therefore, the computer 104 may adjust the audio output mode of audio streams to pause, mute, or lower the volume of sets of content data 300, 302 when conversation is detected. As an example where priority ranking is score based, the computer 104 may decrease the scores of all sets of content data 300, 302 based on a determination that users 200, 202 are conversing. As a further example, the computer 104 determines that users 200, 202 are conversing. The computer 104 then decreases the scores of all sets of content data 300, 302 such that the audio streams of the sets of content data 300, 302 either have their volume decreased or are muted. As an example, where priority ranking is rules based, the computer 104 may directly lower the volume of sets of content data 300, 302 based on detecting conversation.

The computer 104 detects gaze directions of the users 200, 202. The computer 104 can, first, detect the eyes using any suitable eye-detection algorithm, e.g., a shape-based technique using an elliptical eye model or a complex eye model; a feature-based technique such as detecting local features, detecting a filter response, or detecting the pupil and iris; an appearance-based technique; hybrid techniques of the foregoing; etc. The computer 104 can then detect the gaze direction using any suitable gaze-tracking algorithm, e.g., model-based techniques, interpolation-based techniques, appearance-based techniques, visible light-based techniques, etc.

The computer 104 may adjust the priority ranking based on the gaze direction of the users 200, 202, e.g., relative to the graphical component of the sets of content data 300, 302 (e.g., the display screen 108-1, 108-2 displaying the graphical component). The computer 104 may determine and/or adjust the priority ranking for an audio device 110 associated with a user 200, 202 based on the gaze direction of the user 200, 202. In an example where the priority ranking is score based, the computer 104 may increase or decrease the score of a content data 300, 302 based on gaze direction. The computer 104 may increase the content data's score if the computer 104 determines that the user 200, 202 is watching the graphical component of the content data 300, 302 (i.e., the gaze direction of the user 200, 202 is aimed at the portion of the display screen 108-1, 108-2 including the content data). Alternatively, or additionally, the computer 104 may decrease scores of sets of content data 300, 302 which users 200, 202 are not watching. The computer 104 may consult the priority ranking lookup table specifying how to adjust priority score based on gaze direction. The lookup table may specify that, where the user's eyes are looking directly at the graphical component and the user's head is angled towards the graphical component, the computer 104 will increase the priority score of the data by 20. Alternatively, the lookup table may specify that where the user's eyes and head are turned away from the graphical component, the computer 104 will not adjust the priority score. In an example where priority ranking is rules based, the computer 104 may assign higher priority to the content data 300, 302 that the computer 104 determines the user's gaze direction to be directed towards than to the other sets of content data 300, 302.

The computer 104 may determine priority rankings of sets of content data 300, 302 for respective isolated audio devices, and the computer 104 may determine the priority ranking based on gaze direction as described above. For example, the computer 104 may determine a first priority ranking for the non-isolated devices and a second priority ranking for an isolated device. A user 200 associated with the isolated device may shift their gaze direction from a graphical component of a first set of content data 300 to a graphical component of a second set of content data 302. The computer 104 may then retrieve the priority ranking lookup table and adjust the priority scores of the first and second sets of content data 300, 302 accordingly such that the audio stream of the second set of content data 302 is output to the isolated device.

The computer 104 may determine and/or adjust the priority ranking of sets of content data 300, 302 based on a request by the user 200, 202. That is, the user 200, 202 may (possibly based on personal preference or otherwise) request (e.g., via a touchscreen) to raise or lower one of the sets of content data 300, 302 in the priority ranking. In an example where priority ranking is score based, the user 200, 202 may decrease the priority score of the first content data 300 such that the user may view/listen to the second content data 302 instead if the first content data 300 is a talk show hosted by a specific individual which the user 200, 202 does not enjoy. In an example where priority ranking is rules based, the user 200, 202 may simply specify to the computer 104 which content data 300, 302 is to be given the highest priority.

As mentioned above, the computer 104 may determine and/or adjust the priority ranking of sets of content data 300, 302 based on a vehicle state. "Vehicle state" herein means a status of the vehicle 102 as described by physical measurements of the vehicle 102 and/or environment around the vehicle 102. For example, a vehicle state can include one or more of an ambient temperature around the vehicle 102, the cabin temperature of the vehicle 102, a speed of the vehicle 102, a status of movement (e.g., moving or nonmoving and/or parked) of the vehicle 102, etc. The computer 104 may determine a vehicle state based on data collected by sensors 106.

A list of vehicle states may be stored in a memory of the computer 104 (e.g., by a vehicle manufacturer). The computer 104 may then determine a vehicle state or states in real-time or near real-time based on physical measurements of the vehicle 102 and/or an environment in and/or around the vehicle 102. For example, when the vehicle 102 is being operated with no abnormal environmental conditions (e.g., operating on road in full daylight with no precipitation) the computer 104 may determine that the vehicle 102 is in a "normal moving" state. As another example, when the vehicle transmission is in park, the vehicle 102 may be in a "parked" state. As a further example, the vehicle may be in a "navigation" state when a user has selected directions as one of the sets of content data 300, 302 (e.g., a state in which audible navigation instructions could accompany a visual display of a map and/or navigation instructions), or a "abnormal moving state" such as a "potential lane violation" state when the computer 104 determines that the vehicle 102 is not centered in and/or is within a specified distance of an edge of a lane. A vehicle state may be stored with a corresponding weighting to be given to a priority score of content data 300, 302 when the computer 104 determines the state.

As an example of a vehicle state, the vehicle 102 may be travelling on a road in the "normal moving" state, but then could move laterally on a roadway so as to be within a specified lateral distance of a lane line. The computer 104 could then determine that the vehicle 102 is in the "potential lane violation" state. The "potential lane violation" state indicates that a priority score of a "notification" set of content data 300, 302 (e.g. a set of content data notifying the user 200 of the lateral movement) should be weighted to give that set of content data 300, 302 a highest priority for audio playback compared to other set(s) of content data 300, 302 currently being streamed in the vehicle 102. Additionally or alternatively, other sets of content data 300, 302 could have their priorities decreased. The vehicle 102 may remain in the "potential lane violation" state until the vehicle 102 is no longer within a specified distance of a lane line and remains so for a predetermined time (e.g., three or five seconds), and/or until the user dismisses the "notification" set of content data 300, 302.

As a further example of a vehicle state, the vehicle 102 may be traveling on a road in the "normal moving" state. The vehicle 102 is then brought into a lot and parked. The computer 104 can then determine that the current vehicle state is the "parked" state. In the parked state graphical and/or audio components of the sets of content data 300, 302 may now be output by the first display 108-1 (where the normal state may disallow such data 300, 302 components from being output by the first display 108-1, e.g., because it includes entertainment content not suitable for the normal moving or other moving states).

The computer 104 may dynamically adjust a priority score based on dynamic factors such as vehicle states described above. Thus, the computer 104 may actively shift sets of content data 300, 302 between outputting and pausing based on dynamically determined priority scores. For example, a first content data 300 played via a first display 108-1 may be the only data being played at a first time. Then at a second time, a user 200, 202 could request that a second set of content data 302 be played via a second display 108-2. Further, the computer 104 could determine that the priority score of the second content data 302 is higher than the priority score of the first content data 300. Accordingly, the computer 104 could cause playback or streaming of the first content data 300 to be paused or muted after the second time while the second content data 302 is played. Then at a third time the score of the second content data 302 could dynamically change such that the second content data 302 drops below the first content data 300 in a priority ranking. The computer 104 could then, at or after the third time, pause or mute the second content data 302 and plays the first content data 300.

The computer 104 can select an audio stream from one of the sets of content data 300, 302 based on the priority ranking of the sets of content data 300, 302 where the graphical components from a first content data 300 and a second content data 302 are simultaneously being played by one or both of two displays 108-1, 108-2. In this situation, the computer 104 can select the audio stream from the content data 300, 302 ranked highest in the priority ranking.

The computer 104 can cause output of the selected audio stream for a user 200, 202 to the audio device 110 associated with that user 200, 202. Respective audio streams can be given priority scores and/or priority scores can be adjusted based on a user identity associated with a display 108. For example, a user identified as an adult user could be given a higher priority score than a user identified as a younger user (or vice versa).

The computer 104 may mute the audio stream for a set of content data 300, 302 if the respective priority score decreases below a score threshold. The score threshold may be a value specified by a vehicle manufacturer and stored in a memory of the computer 104 and/or may be selected by the user 200, 202.

The computer 104 may, as opposed to muting the audio stream of the content data 300, 302, decrease (but not to zero decibels) the volume of the audio stream of the content data 300, 302 based on the priority score of the sets of content data 300, 302. That is, the computer 104 may increase or decrease volumes of audio streams of sets of content data 300, 302 where priority scores are increased or decreased. For example, the volume of sets of content data 300, 302 may be a percentage of maximum volume corresponding to priority score within the priority ranking. A priority score of 50 may result in the computer 104 adjusting the volume of the audio stream to be 50% of maximum volume.

The computer 104 may pause or mute sets of content data 300, 302 (or at least one of the graphical component and audio stream of the content data 300, 302) based on one of the sets of content data 300, 302 being outside of a variation threshold. The variation threshold may be a range of values on the priority scale (e.g. 1-100). The computer 104 may allow both sets of content data 300, 302 to be output simultaneously (provided that audio isolation or personal audio devices 110 are available for those sets of content data 300, 302 which include audio streams) where both sets of content data 300, 302 have priority scores within the variation threshold. Otherwise, if the sets of content data 300, 302 have priority scores which vary by an amount greater than the variation threshold, then the computer 104 may pause or mute the content data 300, 302 with the lower priority score. For example, the first content data 300 may have a priority score of 50 and the second content data 302 may have a priority score of 60. If the variation threshold is 20, then both sets of content data 300, 302 may be played simultaneously. However, if the variation threshold were 5, then the computer 104 may pause or mute the first content data.

Figure 4:
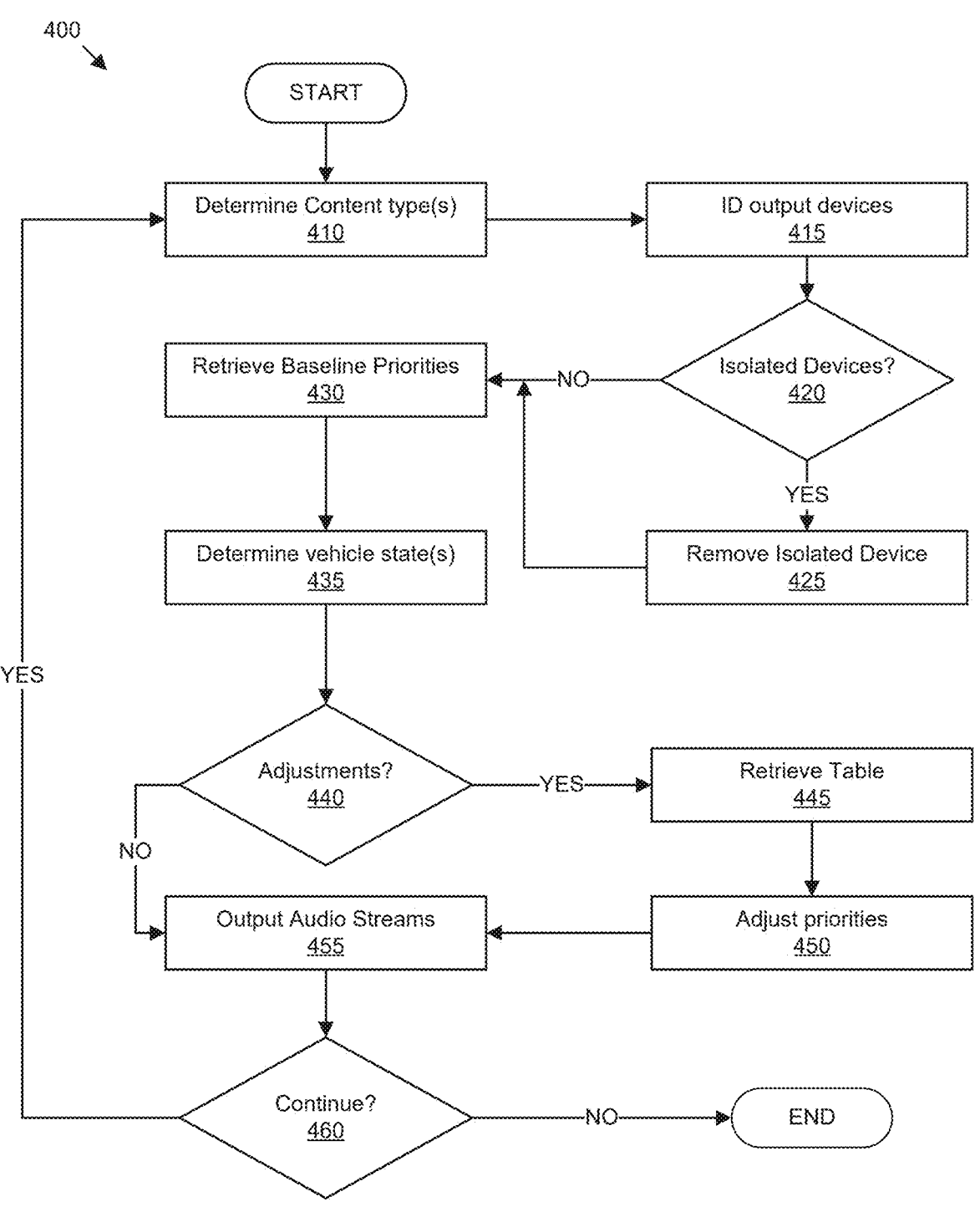
FIG. 4 is a flowchart diagram of an example process to output audio data.

FIG. 4, described with reference to FIGS. 1-3, illustrates an example process 400 for determining priority rankings of sets of content data 300, 302 and for displaying sets of content data 300, 302 based on the respective priority ranking. The process can be carried out according to program instructions executed by the computer 104.

The process begins in a block 410 in which, when multiple sets of content are being played in the vehicle 102, typically associated with respective displays 108, the computer 104 determines the content types of the sets of content data 300, 302 (e.g. podcast, navigation, alert, etc.).

Next, in a block 415, the computer 104 identifies audio devices 110 receiving sets of content 300, 302. For example, devices 110 could be identified as front-cabin speakers, rear-cabin speakers, Bluetooth headset, portable device, etc.

Next, in a decision block 420, the computer 104 determines whether any isolated devices 110 are present in the vehicle 102 (i.e., whether any audio devices 110 identified in the block 415 and receiving audio for the respective sets of content 300, 302, are isolated devices 110). If there are isolated devices, the process continues to block 425. Otherwise the process continues to block 430.

In the block 425, the computer 104 has determined that there are isolated audio devices 110 present in the vehicle 102. The computer 104 removes the isolated devices from the priority ranking calculations because the isolated devices 110 may only output those sets of content data 300, 302 specifically selected by the user 200, 202 of the isolated audio device 110, and that audio output typically cannot be heard by other occupants of the vehicle 102 cabin.

Next, in a block 430, the computer 104 retrieves the stored baseline priority scores assigned to the various sets of content data 300, 302 based on their content types.

Next, in a block 435, the computer 104 determines a vehicle state or states based on a stored vehicle state diagram described above.

Next, in a decision block 440, the computer 104 determines whether the vehicle 102 is in a vehicle state that warrants adjusting baseline priority scores. For example, as explained above, a vehicle in a "potential lane violation state" could warrant adjusting priority scores. Further, for example, priority scores could be adjusted based on user data such as a gaze direction or data such as a sub-type of a set of content data 300, 302. If priority scores are to be adjusted, the process 400 proceeds to a block 445. Otherwise the process continues to block 455.

In the block 445, the computer 104 retrieves a lookup table or the like specifying the adjustments to make to the priority score of each set of content data 300, 302 based on a current vehicle state and/or factors described above (e.g. content sub-type, gaze direction, a potential lane violation state, etc.).

Next, in a block 450, the computer 104 adjusts the priority scores of the sets of content data 300, 302. The computer 104 could make such adjustments based on the lookup table and equation 1 above, for example.

Next, in a block 455, the computer 104 outputs the audio streams for respective sets of contents data 300, 302 according to the priority scores. As described above, the highest priority sets of content data 300, 302 may be output while lower priority sets of content data 300, 302 may have their output mode adjusted to be lowered or muted.

Next, in the block 460, the computer 104 determines whether to continue the process 400. For example, once the process 400 is initiated, the computer 104 may continue to determine priority rankings by returning to block 410. However, the process 400 may end upon some input or event to terminate the process 400 such as a user 200, 202 ceasing operation of the vehicle 102 (e.g., turning off a propulsion system such as an engine), a user providing input to end the process 400, etc. If the process 400 is to continue, then the process returns to block 410. Otherwise, the process 400 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The adjectives "first" and "second" are used throughout this document as identifiers and are not intended to signify importance, order, or quantity. Use of "in response to," "upon determining," etc. indicates a causal relationship, not merely a temporal relationship. Operations, systems, and methods described herein should always be implemented and/or performed in accordance with an applicable user's manual and/or guidelines.

The invention claimed is:

1. A system, comprising a computer for a vehicle, the computer including a processor and a memory, the memory storing instructions executable by the processor, including instructions to:

receive a first set of content data including a first graphical component and a first audio stream and a second set of content data including a second graphical component and a second audio stream;

determine a vehicle state of the vehicle selected from a list of potential vehicle states;

dynamically adjust a priority determination based on a change in the determined vehicle state, the priority determination including at least one of a priority of the first set of content data or a priority of the second set of content data; and select a first audio output mode for the first audio stream and a second audio output mode for the second audio stream based on the priority determination.

2. The system of claim 1, wherein the first graphical component is output by a first display and the second graphical component is output by a second display.

3. The system of claim 1, wherein the vehicle state is a normal moving state, and the priority is determined according to the normal moving state.

4. The system of claim 1, wherein the vehicle state is a parked state, and the priority is determined according to the parked state.

5. The system of claim 1, the instructions further comprising instructions to receive a third content data including a third graphical component and a third audio stream and having a priority based on the vehicle state.

6. The system of claim 1, wherein the first audio output mode and/or the second audio output mode includes muting or suppressing audio.

7. The system of claim 1, wherein selecting the audio output mode includes selecting an audio device to output the audio stream.

8. The system of claim 1, the instructions including further instructions to determine whether an audio device is capable of audio isolation, and to select the output mode based on whether the audio device is capable of audio isolation.

9. The system of claim 1, wherein the priority of the first and second sets of content data is based on an identity of a user associated with the first or second sets of content data.

10. The system of claim 1, wherein the priority of the first and second sets of content data is based on a content type of the first and second sets of content data.

11. The system of claim 1, wherein the priority of the first and second sets of content data is based on a gaze direction of a user.

12. A method comprising:

receiving a first set of content data including a first graphical component and a first audio stream and a second set of content data including a second graphical component and a second audio stream;

determining a vehicle state of the vehicle selected from a list of potential vehicle states;

dynamically adjusting a priority determination based on a change in the determined vehicle state, the priority determination including at least one of a priority of the first set of content data or a priority of the second set of content data; and selecting a first audio output mode for the first audio stream and a second audio output mode for the second audio stream based on the priority determination.

13. The method of claim 12, wherein the first graphical component is output by a first display and the second graphical component is output by a second display.

14. The method of claim 12, wherein the vehicle state is a normal moving state, and the priority is determined according to the normal moving state.

15. The method of claim 12, wherein the vehicle state is a parked state, and the priority is determined according to the parked state.

16. The method of claim 12, further comprising receiving a third content data including a third graphical component and a third audio stream and having a priority based on the vehicle state.

17. The method of claim 12, wherein the first audio output mode and/or the second audio output mode includes muting or suppressing audio.

18. The method of claim 12, wherein selecting the audio output mode includes selecting an audio device to output the audio stream.

19. The method of claim 12, further comprising determining whether an audio device is capable of audio isolation, and selecting the output mode based on whether the audio device is capable of audio isolation.

20. The method of claim 12, wherein the priority of the first and second sets of content data is based on an identity of a user associated with the first or second sets of content data.

* * * * *